April 10, 1934.   W. H. FARR   1,954,445
WIRE WHEEL AND METHOD OF FORMING THE SAME
Filed Feb. 10, 1931
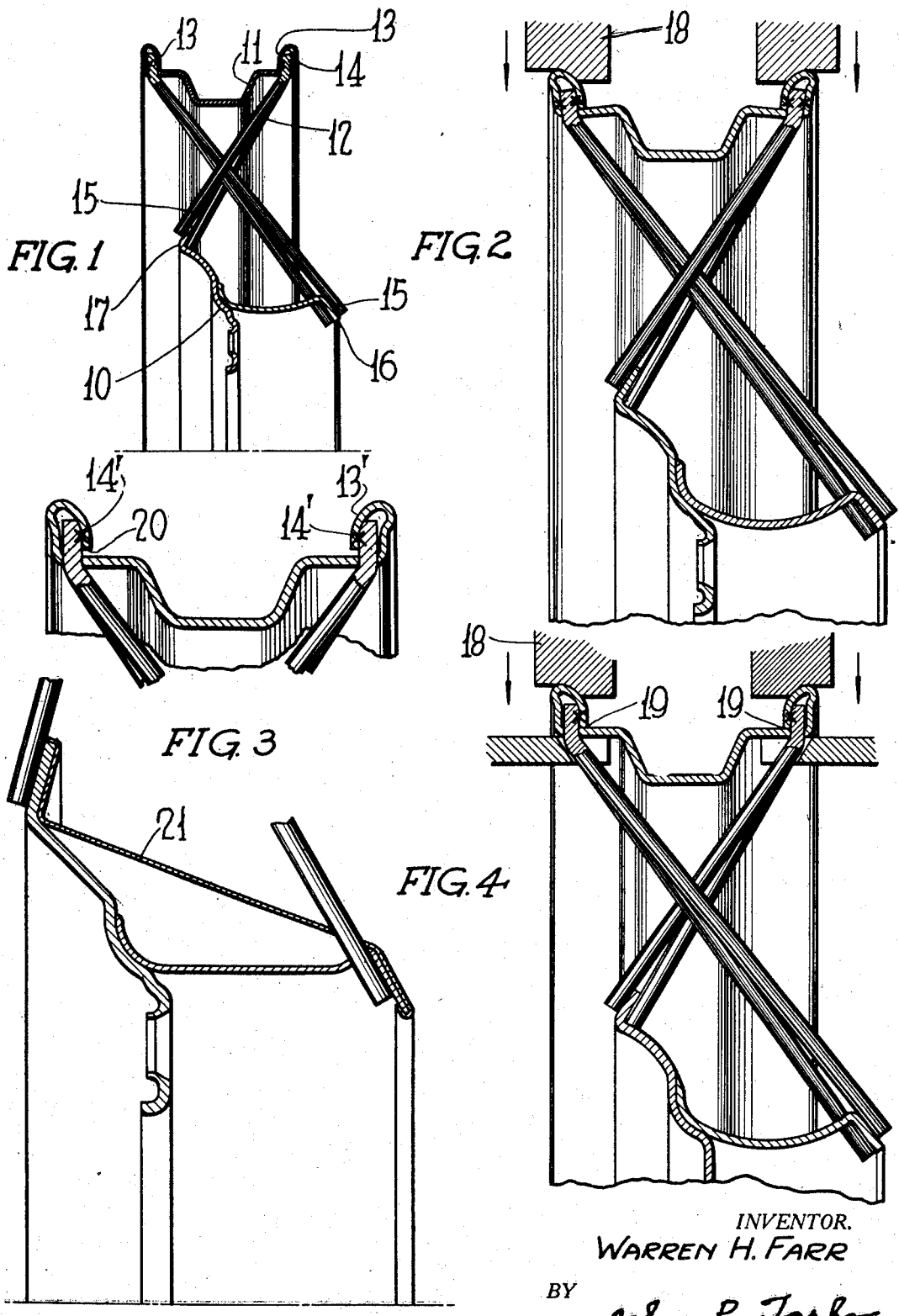
INVENTOR.
WARREN H. FARR
BY John P. Tarbox
ATTORNEY.

Patented Apr. 10, 1934

1,954,445

UNITED STATES PATENT OFFICE 1,954,445

WIRE WHEEL AND METHOD OF FORMING THE SAME

Warren H. Farr, Detroit, Mich., assignor to Budd Wheel Company, Philadelphia, Pa., a corporation of Pennsylvania Application February 10, 1931, Serial No. 514,716

10 Claims. (Cl. 29—159.02)

My invention relates to the art of wire wheels and is particularly concerned with the manufacture of a wire wheel by an improved method, whereby adequate tension is produced in the wheel in a simple and effective manner.

A further object of my invention has been to produce a wire wheel of pleasing ornamental appearance and simple construction in which all possibility of damage to the inner tube by reason of projecting spoke portions is obviated.

A further object of my invention has been to produce a wire wheel having a hub shell capable of assuming a great variety of ornamental forms.

Other objects and advantages of my invention will be obvious from a reading of the subjoined specification in the light of the attached drawing, in which, Figure 1 is a central axial section through my improved wheel.

Figure 2 is a similar view illustrating a step in the manufacture of the wheel of Figure 1.

Figure 3 is an enlarged sectional view similar to Figure 1 illustrating the rim construction of a modified wheel.

Figure 4 is a view similar to Figure 2 illustrating a step in the manufacture of the wheel illustrated in Figure 3.

Figure 5 is a central axial section illustrating a preferred method of masking the hub shell of either of the embodiments of Figures 1 and 3.

Referring to the drawing by reference characters, the numeral 10 indicates a wire wheel hub shell which is inter-connected with a rim 11 by means of wire spokes 12. Although the rim illustrated in the drawing is of the drop center type it may assume other forms within the spirit of my invention.

The axial extremities of the rim are turned axially and radially inwardly toward the center of the wheel to provide annular spaces adapted to receive spoke extremities. An annular space is thus provided adapted to receive the spoke ends and shield the tire from any possibility of rupture thereby. The spoke ends are preferably welded to the radially extending portions of the rim as indicated at 14.

The spokes may be secured to the hub shell in any suitable manner. In the present instance I have illustrated a radially inwardly extending flange 16 on the outer axial extremity of the hub shell, and a radially outwardly extending flange 17 on its inner axial extremity and the inner ends of the spokes are line welded directly to these radially extending surfaces as indicated at 15.

In the modification of Figure 3 I have disclosed spokes welded only to the curled over edges of the rim extremities as indicated at 14', these curled over edges being spaced from the bead seating portions of the rim as indicated at 20 in the finished wheel. It will be readily seen that my improved wheel presents a pleasing and ornamental appearance and is free from destructive projections.

In the manufacture of my improved wheel of the form shown in Figure 1, I first bend the extremities of the rim inwardly as indicated at 13 and thereafter pass spokes through openings in the bead seating portions of the rim into the annular space enclosed by the inturned portions of the rim. The spokes are thereafter welded as indicated at 14 by means of suitable electrodes applied to portions of the rim adjacent the spoke extremities. The rim and spokes are thereafter assembled with the hub and contracting dies are applied to the outer axial extremities of the rim upon the beads formed by the turned over edges 13 to effect a simultaneous lateral flexing and circumferential contriction of the rim. This flexing of the rim forces the inner ends of the spokes inwardly with respect to the flanges of the hub shell to which they are to be welded. While the hub shell and rim are held in this relative position the inner ends of the spokes are secured to the hub shell, preferably by welding. After the weld has cooled, the contracting dies 18 are released, thus allowing the edges of the rim to return toward their natural positions and tension the spokes.

As explained above, in the modification of Figure 3, the spokes are welded only to the inwardly turned edges of the rim and these edges are normally spaced from the bead seating base of the rim. As a consequence, the application of dies 18 to the rim beads causes a flexure of these beads into a position in which the lower edges of the inturned portions abut the bead seating laterally extending portions of the rim. In this form, I thus take advantage not only of the lateral and circumferential flexure of the rim in general, but I also obtain an additional flexure and an additional resilient pull upon the spokes incident to the release thereof by reason of the resilience of the inturned margins of the rim.

In Figure 5 I have illustrated a mask 21 which may be formed of stainless steel or other suitable ornamental material as secured to the flanges at opposite extremities of the hub shell. By employing such a mask I am enabled to give the hub shell any suitable desired ornamental shape at the same time that I provide an outer shell of a metal having the desired ornamental characteristics.

It will thus be seen that I have not only devised a wire wheel of improved ornamental appearance and structural characteristics but that I have invented a method of manufacturing such a wheel whereby the desired spoke tensioning is achieved in a simple and highly effective manner.

Modifications will be obvious to those skilled in the art, and I do not therefore wish to be limited except by the scope of my sub-joined claims as interpreted in the light of the generic spirit of my invention.

What I claim is:

1. A wire wheel comprising, in combination, a hub shell and rim interconnected by wire spokes, the rim having its outer edges turned axially and radially inward toward a laterally extending surface of said rim to provide annular spaces adapted to receive spoke extremities, and a plurality of spokes passing through openings in the rim and welded to an inner surface of the inwardly turned portion of the rim.

2. A wire wheel comprising in combination, a hub shell and rim interconnected by wire spokes, said hub shell having an outwardly radially extending flange at its inner axial extremity, and an inwardly radially extending flange at its outer axial extremity, and a thin shell of sheet metal enclosing said hub shell and secured to said flanges to mask the shape of the hub shell.

3. The method of tensioning a wire wheel which comprises securing the spokes to portions of the rim removed from its center, exerting pressure upon portions of the rim adjacent its axial extremities to bend these extremities laterally and circumferentially, whereby to move the spokes radially inwardly with respect to the hub shell, securing the spokes to the hub shell while the rim is held in bent condition, and releasing the rim to allow it to spring back and tension the spokes.

4. The method of manufacturing a wire wheel which comprises bending the axial extremities of a rim inwardly toward a laterally extending surface thereof, passing the outer ends of a series of spokes through openings in the rim, welding the spokes at their outer extremities to the inwardly bent portions of the rim, bending the axial extremities of the rim laterally and inwardly independently of the base of the rim and securing the inner extremities of the spokes to a hub shell while the rim is held in bent condition, and releasing the rim to allow it to spring back and tension the spokes.

5. The method of manufacturing a wire wheel which comprises bending the axial extremities of a rim inwardly independently of the base of the rim, passing the outer ends of a series of spokes through openings in the rim, welding the spokes on their outer extremities to the inwardly bent portions of the rim, bending the rim laterally and welding the inner extremities of the spokes to a hub shell while the rim is held in bent condition, and releasing the rim to allow it to spring back and tension the spokes.

6. The method of manufacturing a wire wheel which comprises bending the outer radial extremities of a drop center rim axially and radially inward toward the bead seating portion of the rim to provide annular spaces on opposite sides of the rim, passing spokes through openings into said annular spaces, securing the spokes to the rim within said annular spaces, bending the rim laterally after the spokes are so secured, securing the spokes to a hub shell while the rim is held in bent condition, and thereafter releasing the rim to allow it to spring back and tension the spokes.

7. The method of manufacturing a wire wheel which comprises bending the outer radial extremities of a drop center rim axially and radially inward toward the bead seating portion of the rim to provide annular spaces on opposite sides of the rim, passing spokes through openings into said annular spaces, welding the spokes to the inturned edges of the rim within said annular spaces, bending the rim laterally after the spokes are so secured, securing the spokes to a hub shell while the rim is held in bent condition, and thereafter releasing the rim to allow it to spring back and tension the spokes.

8. The method of manufacturing a wire wheel which comprises bending the outer radial extremities of a drop center rim axially and radially inward toward the bead seating portion of the rim to provide annular spaces on opposite sides of the rim, passing spokes through openings into said annular spaces, welding the spokes to the inturned edges of the rim and to the inner sides of the outer radial edges thereof within said annular spaces, bending the rim laterally after the spokes are so secured, securing the spokes to a hub shell while the rim is held in bent condition, and thereafter releasing the rim to allow it to spring back and tension the spokes.

9. A wire wheel comprising, in combination, a hub shell and rim interconnected by wire spokes, the rim having its axial extremities turned radially outwardly then axially inwardly and then radially inwardly toward a laterally extending surface of said rim to provide annular spaces adapted to receive spoke extremities, and a plurality of spokes passing through openings in the rim and welded to the inner surfaces of both said radially extending portions of the rim extremities.

10. The method of tensioning a wire wheel which comprises securing the spokes to portions of the rim projecting radially outwardly of its base adjacent its axial extremities, exerting pressure upon these outwardly projecting portions to flex them independently of the rim base inwardly toward the hub shell, securing the spokes to the hub shell while these portions are so held in flexed condition, and releasing the pressure upon these portions to allow them to spring back and tension the spokes.

WARREN H. FARR.